3,386,812
CASTABLE MACHINE TOOL BIT COMPOSITION
OF BORON CARBIDE AND NICKEL
Haskell Sheinberg, Los Alamos, N. Mex., assignor to the United States of America as represented by the United States Atomic Energy Commission
No Drawing. Filed Dec. 23, 1965, Ser. No. 516,148
2 Claims. (Cl. 29—182.8)

ABSTRACT OF THE DISCLOSURE

A machine tool bit composition and method for making same in which 80 v/o Ni-20 v/o $B_4C$ powders are mixed, pressed and heated to a temperature of about 1530° C. in argon or $H_2$ gas atmosphere.

---

The present invention relates to a machine tool bit composition and, more particularly, to an extremely hard composition which is castable utilizing conventional furnaces. The invention described herein was made in the course of, or under, a contract with the U.S. Atomic Energy Commission.

The extra hard tool bits which are presently in use (about 1100 DPH) have very high melting temperatures and are consequently shaped by powder metallurgy techniques. It would be advantageous to develop a very hard tool bit composition which can be melted at fairly low temperatures so that the bit would be castable.

Accordingly, an object of the present invention is to provide a composition suitable for an extra hard tool bit which may be formed by casting.

The invention is based on the discovery that heating 80 v/o Ni-20 v/o $B_4C$ powders to about 1530° C. in argon or $H_2$ gas yields a low melting point compound of extreme hardness (1100 DPH).

In one specific embodiment, 5.02 g. $B_4C$ (nominally —100+230 mesh) was blended with 71.2 g. Ni which is approximately 7 w/o $B_4C$-93 w/o Ni (Fisher average particle sizes—3.9 microns) for 4 hrs. in a bottle with aluminum agitator wires. The blended mixture was then pressed in a 1-in. I.D. steel die at 19 tons/sq. in. to a density of 68% of theoretical. The pressed piece was sintered in a clean alumina boat in a Bell jar type furnace at 1530° C. (optical) for approximately 10 minutes under argon. In another specific embodiment 7.53 g. $B_4C$ (—120+200 mesh) was blended with 106.6 g. Ni which is approximately 7 w/o $B_4C$-93 w/o Ni (Fischer average particle size—3.9 microns) for 4 hrs. with aluminum agitator wires in a bottle. The blended mixture was then pressed in a 1-in. x 3-in. steel die at 16½ tons/sq. in. to a density of 65% theoretical. The pressed piece was heated in a clean alumina boat in a tube furnace at 1530° C. for 25 minutes in $H_2$.

Clearly, the material could be cast and formed simultaneously since merely heating forms the desired compound. Stirring of the material would be a desirable feature but is in no way necessary.

Even though the $B_4C$ is an exceedingly high melting point compound, the reaction is quite fast (less than one-half hour) and fine grains are formed. In addition the resulting composition is fully dense and of uniform structure, i.e., there is about the same amount of matrix material around all particles. The precise structure of the resulting material is not known at this time but is felt to be a nickel rich boride (or carbide) with a carbide precipitate at grain boundaries.

What is claimed is:
1. A method of forming a composition consisting essentially of mixing 93 w/o Ni and 7 w/o $B_4C$ powders, pressing, and heating to about 1530° C. in an environment selected from the class consisting of an inert and reducing atmosphere.
2. A castable machine tool bit composition consisting of approximately 93 w/o Ni, the balance being $B_4C$.

References Cited

UNITED STATES PATENTS

| | | | |
|---|---|---|---|
| 2,124,538 | 7/1938 | Boyer | 75—204 |
| 3,178,807 | 4/1965 | Bergmann | 75—204 |
| 3,306,741 | 2/1967 | Lallemant | 75—204 |

OTHER REFERENCES

"Refractory Hard Metals," Schwarzkopf et al., Macmillan Co., New York, 1953, p. 412.

CARL D. QUARFORTH, Primary Examiner.

L. DEWAYNE RUTLEDGE, Examiner.

R. L. GRUDZIECKI, Assistant Examiner.